Nov. 22, 1966     B. O. BURSON     3,287,619
PERMANENT MAGNET GENERATOR OUTPUT CONTROL
Filed Aug. 14, 1962

INVENTOR.
BOB O. BURSON
BY
Raymond A. Paquin
ATTORNEY.

United States Patent Office 3,287,619
Patented Nov. 22, 1966

3,287,619
PERMANENT MAGNET GENERATOR
OUTPUT CONTROL
Bob O. Burson, Longmeadow, Mass., assignor, by mesne assignments, to Elci Products Corporation, Carolina, Puerto Rico, a corporation of Puerto Rico
Filed Aug. 14, 1962, Ser. No. 216,783
8 Claims. (Cl. 321—16)

This invention relates to regulators and more particularly to a new and improved regulator for use in regulating the output of a permanent magnet type of alternator, used in conjunction with rectifying means such as a bridge rectifier to obtain direct-current output.

In prior regulating devices of this type, difficulty was found in the regulation of the output of the alternator as the field strength cannot be controlled as in an electromagnetic machine.

An object of the invention is to provide a new and improved means for regulating the output of a permanent magnet type of alternator used in conjunction with rectifying means such as a bridge rectifier to obtain direct-current output, which regulating means overcomes this difficulty and provides simple and efficient regulation of said alternator.

I accomplish this object by shorting out a portion of the single phase rectifier which accompanies the alternator. With a portion such as one-half of the generating wave shorted in this manner, I have found that a very low output can be achieved, which low output is entirely satisfactory for a battery charging circuit. Any desired output between the above minimum and the unshorted maximum can be obtained through the mere insertion of the correct value of resistance in the shorting circuit. No extra diodes are required for this method of regulation.

This short circuiting of the rectifier may be accomplished by several means, three of which are illustrated in the accompanying drawings and will be later described.

Other objects and advantages of the invention will be apparent from the following description taken in connection with the accompanying drawings. It will be understood that changes may be made in the details of construction and arrangement of parts shown and described as the preferred forms have been given by way of illustration only.

Figure 1:
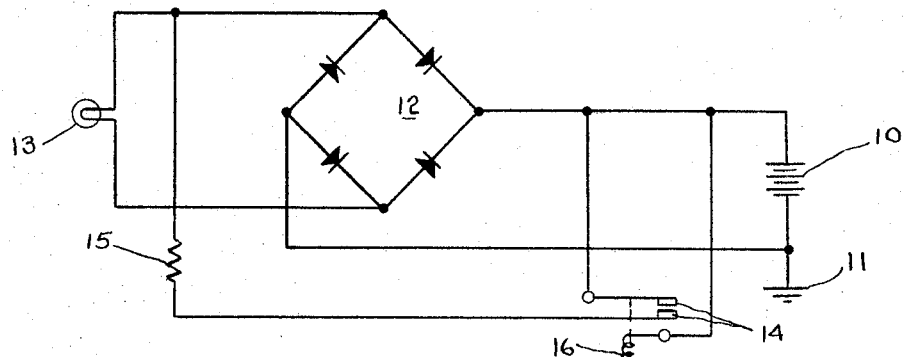
Figure 2:
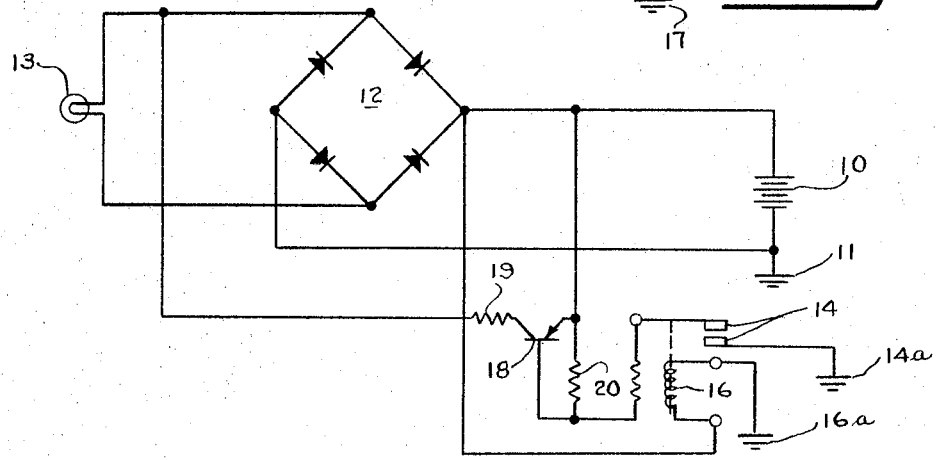
Figure 3:
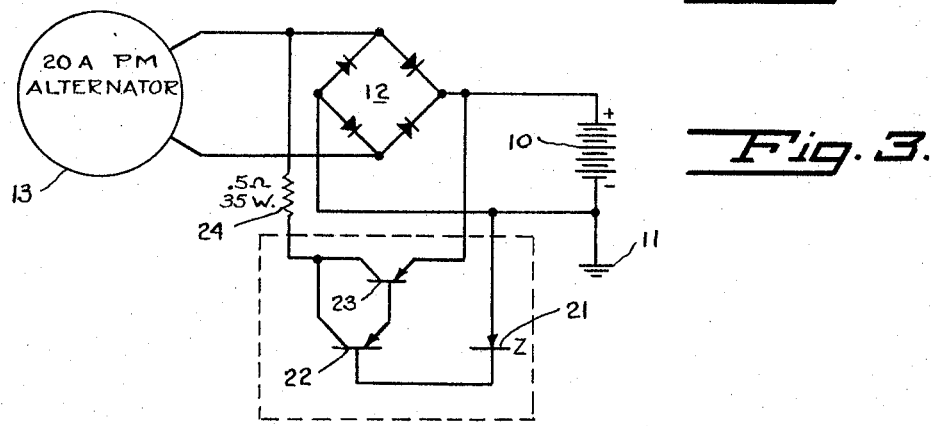

Referring to the drawings:
FIG. 1 is a schematic view of an alternator used in connection with a bridge rectifier to obtain direct-current output in combination with one embodiment of the invention;
FIG. 2 is a schematic view of the alternator and bridge rectifier shown in FIG. 1 in combination with a second embodiment of the invention; and
FIG. 3 is a schematic view of the alternator and bridge rectifier shown in FIGS. 1 and 2 in combination with a third embodiment of the invention.

Referring more particularly to the drawings wherein similar reference numerals designate corresponding parts throughout the several views, there is provided for supplying direct-current to a battery 10 grounded by ground 11 for the purpose of charging said battery 10 a direct-current supply source. The direct-current supply source comprises a single phase bridge rectifier 12 having its input terminals connected to a permanent magnet type alternator 13 and its output terminals connected to the battery 10.

In the three drawings, three different means are shown for shorting out one-half of the bridge rectifier 12 and, thus, controlling the output from the alternator 13 to the battery 10.

The first of these, that shown in FIG. 1, includes a pair of relay contacts 14 with one of said relay contacts 14 being connected through the resistance 15 to one of the output terminals of the alternator 13. The other of said relay contacts 14 is connected to one of the output terminals of the bridge rectifier 12. A relay coil 16, grounded at 17, is also connected to one of the output terminals of the bridge rectifier 12. In this embodiment of the invention, the relay contacts 14 close and establish the shunt path when the voltage rises above the desired value. The contacts and rectifier diodes are always protected because no part of the circuit can ever be subjected to voltages above the maximum regulated, as no current carrying circuit is ever opened. Furthermore, this embodiment of the invention will regulate the alternator 13 from maximum output to one selected minimum value as was previously described.

A second method for shorting the bridge rectifier 12, and, thus regulating the output of the alternator 13 is shown in FIG. 2. This method again employs a pair of relay contacts 14 and a relay coil 16, said relay contacts 14 and relay coil 16 being shown in FIG. 2 as grounded at 14a and 16a respectively.

Said relay contacts 14 and relay coil 16 in this embodiment of the invention act to control the low gain, high power type transistor 18, said transistor 18 being connected through the resistance 19 to one of the output terminals of the alternator 13 and through the resistance 20 to one of the output terminals of the bridge rectifier 12. Instead of a transistor 18, a controlled rectifier may be substituted by minor alterations of the circuit to adapt such device. Such alteration involves changing the control circuit connection from the base of the power transistor to the gate terminal of the control rectifier. This allows use of a control rectifier of suitable capacity and permits control of permanent magnet alternators of extremely high output.

Thus, when voltage is applied to the base of the transistor 18 by the relay consisting of the relay contacts 14 and the relay coil 16, a low impedance short circuit path is established.

In FIG. 3, a third method of shorting the bridge rectifier is illustrated. This method employs neither movable contacts nor other movable components. It, rather, completely utilizes components in completely solid state.

In this embodiment of the invention, a zener diode 21 is connected between a first stage high gain transistor 22 and the bridge rectifier-battery circuit. Said zener diode 21 is, further, utilized to sense output voltage and, also, to control said transistor 22.

A low gain, high power transistor 23 is provided directly adjacent to said transistor 22, said high power transistor being connected to one of the output terminals of the bridge rectifier 12 and through a resistance 24 to one of the output terminals of the alternator 13. Said transistor 22 is utilized to control said transistor 23 such that said transistor 23 forms the short circuit path when activated by the transistor 22.

A single high power, high gain transistor may be used in place of said transistor 22 and said transistor 23 without either adversely affecting the operation of the device or departing from the spirit of the invention.

The operation of the new and improved regulating device herein provided is in the manner obvious from the aforegoing description taken in connection with the accompanying drawings.

From the foregoing, it will be seen that I have provided new and improved means for regulating a permanent magnet type of alternator, used in conjunction with a bridge rectifier to obtain direct-current output.

Thus, from the foregoing, it will be seen that I have provided new and improved means for obtaining all of the objects and advantages of the invention.

I claim:
1. In a device of the character described, a permanent magnet type alternator, rectifying means operatively connected to said alternator, and means for shorting one-half of said rectifying means such as to regulate by shunting the alternating current side of said rectifying means, said means comprising a pair of relay contacts connected to the base of a low gain, high power transistor, said transistor, being connected to one of the outputs of the alternator and to one of the outputs of the rectifying means, and a relay coil, said relay coil being connected to one of the output terminals of the rectifying means.

2. In a device of the character described, a permanent magnet type alternator, rectifying means operatively connected to said alternator, and means for shorting one-half of said rectifying means, said means comprising a pair of relay contacts connected to the base of a low gain, high power transistor, said transistor being connected to one of the outputs of the alternator and to one of the outputs of the rectifying means, and a relay coil, said relay coil being connected to one of the output terminals of the rectifying means and being connected to a ground.

3. In a device of the character described, a permanent magnet type alternator, rectifying means operatively connected to said alternator, and means for shorting one-half of said rectifying means such as to regulate by shunting the alternating current side of said rectifying means, said means comprising a zener diode connected to an output of the rectifying means, high gain transistor means positioned after said zener diode, and low gain high power transistor means connected to one of the outputs of the alternator and to one of the outputs of the rectifying means, said high gain transistor and said low gain high power transistor being operatively connected to each other.

4. In a device of the character described, a permanent magnet type alternator, rectifying means operatively connected to said alternator, and means for shorting one-half of said rectifying means, said means comprising a zener diode connected to an output of the rectifying means, and a high power, high gain transistor, said transistor being connected to one of the outputs of the rectifying means and to one of the outputs of the alternator, said zener diode being connected to said high power high gain transistor.

5. In a device of the character described, a permanent magnet type alternator, rectifying means operatively connected to said alternator, and means for shorting one-half of said rectifying means such as to regulate by shunting the alternating current side of said rectifying means, said means comprising a pair of relay contacts connected through resistance to the base of a low gain, high power transistor, said transistor being connected through resistance to one of the outputs of the alternator and to one of the outputs of the rectifying means, and a relay coil, said relay coil being connected to one of the output terminals of the rectifying means.

6. In a device of the character described, a permanent magnet type alternator, rectifying means operatively connected to said alternator, and means for shorting one-half of said rectifying means such as to regulate by shunting the alternating current side of said rectifying means, said means comprising a pair of relay contacts connected through resistance to the base of a low gain, high power transistor, said transistor being connected through resistance to one of the outputs of the alternator and to one of the outputs of the rectifying means, and a relay coil, said relay coil being connected to one of the output terminals of the rectifying means and being connected to a ground.

7. In a device of the character described, a permanent magnet type alternator, rectifying means operatively connected to said alternator, and means for shorting one-half of said rectifying means, said means comprising a zener diode connected to an output of the rectifying means, high gain transistor means positioned after said zener diode, and low gain high power transistor means connected through resistance to one of the outputs of the alternator and to one of the outputs of the rectifying means, said high gain transistor and said low gain high power transistor being operatively connected to each other.

8. In a device of the character described, a permanent magnet type alternator, rectifying means operatively connected to said alternator, and means for shorting one-half of said rectifying means for regulating by shunting the alternating current side of said rectifying means, said means comprising a zener diode connected to an output of the rectifying means, and a high power, high gain transistor, said transistor being connected to one of the outputs of the rectifying means and, through resistance, to one of the outputs of the alternator, said zener diode being connected to said high power high gain transistor.

References Cited by the Examiner
UNITED STATES PATENTS

| | | |
|---|---|---|
| 2,751,550 | 6/1956 | Chase. |
| 2,850,695 | 9/1958 | Bishop _____ 323—8 X |
| 3,219,903 | 11/1965 | Larson _____ 320—61 |

FOREIGN PATENTS

| | | |
|---|---|---|
| 1,176,140 | 11/1958 | France. |
| 759,885 | 9/1956 | Great Britain. |
| 275,263 | 8/1951 | Switzerland. |

JOHN F. COUCH, *Primary Examiner.*

LLOYD McCOLLUM, *Examiner.*

J. M. THOMSON, M. L. WACHTELL,
*Assistant Examiners.*